Patented May 6, 1952

2,595,943

UNITED STATES PATENT OFFICE 2,595,943

METHOD OF HARDENING BAUXITE WITH CALCIUM SULFATE

Heinz Heinemann, Drexel Hill, Pa., assignor to Porocel Corporation, Philadelphia, Pa., a corporation of Delaware No Drawing. Application April 26, 1949, Serial No. 89,813

6 Claims. (Cl. 252—440)

The present invention relates to a method of hardening bauxite granules for use in the treatment of petroleum and its products, and particularly in the conversion, refining, and decolorization of hydrocarbon oils.

A further object of this invention is the production of hardened bauxite granules suitable as such for the thermal conversion of hydrocarbons, and also suitable as carriers or supporting agents for a variety of catalysts, including metals, metal oxides, and metal salts.

The hardness of bauxite granules, i. e., their resistance to abrasion, compression, and friction, is of considerable importance in commercial installations in which bauxite is disposed in towers or columns for contact with fluids. While such granules have a certain natural hardness or a hardness imparted by conventional thermal activation, it is desirable in most cases where operating conditions are severe, to further strengthen them. Such increase in strength or hardness should be accomplished in a manner which does not materially change the physical characteristics of the granules, i. e., their porous nature and high surface area, and which does not introduce chemical constituents detrimental to the various uses to which the bauxite may be put.

I have found that it is possible to increase the hardness of bauxite granules of desired size which have been thermally activated by heating at 600° F. to 1200° F. to reduce the volatile matter content (mostly water) to a value between 1% and 10%, by impregnating the granules with from 2% to 10%, and preferably 3% to 5% of calcium sulfate, which is most advantageously formed in situ. Less than about 2% of calcium sulfate does not impart sufficient hardness to justify its use, whereas more than about 10% has an adverse effect upon the bauxite as a refining agent, catalyst, or catalyst carrier. A satisfactory method of impregnation is to soak the bauxite granules in a solution of a soluble calcium salt such as the chloride, nitrate, or acetate, and then convert the soluble salt into insoluble calcium sulfate by treatment with sulfuric acid, preferably in dilute solution of the order of 5% to 25% concentration. The impregnated granules may then be washed with water or dilute ammonium hydroxide solution to remove soluble salts or excess free acid. When the granules are to be further impregnated with an ammonical solution of a catalytic agent, for example, ammonium molybdate solution, no preliminary washing is required.

The amount and concentration of solution of the soluble calcium salt may be controlled to give the desired amount of calcium sulfate in the bauxite granules. In general, it is desirable to employ solutions of such concentration as to permit thorough and uniform impregnation without leaving an excess or drainable amount, i. e., substantially all of the solution is adsorbed or absorbed by the bauxite granules. The impregnated granules are then treated with dilute sulfuric acid, preferably in an amount slightly in excess of the stoichiometric amount required to convert the soluble calcium salt into insoluble calcium sulfate. After water washing, or neutralization and washing with ammonium hydroxide solution, the bauxite granules may be dried and/or calcined by heating at 600° F. to 1200° F. prior to use. When the granules are to be further impregnated with a catalytic agent or promoter, the washed or unwashed granules may be mixed with a solution of salt from which the catalytic agent is to be derived, or such granules may be impregnated directly with a melt of the salt of the catalytic agent. The procedure for introducing the catalytic agent or promoter is conventional and has been disclosed in the prior patent and chemical literature, and therefore requires no further elaboration here. The calcium sulfate-hardened bauxite has the same capacity for taking up catalytic agents or promoters as the natural or unhardened bauxite, and the presence of the calcium sulfate does not reduce the surface area or catalytic efficiency of the finished catalysts, while materially hardening them.

The present invention may be further illustrated by the following examples, which, however, are not to be construed as limiting the scope thereof.

(1) Natural bauxite ore was dried, crushed, screened to 2/4 mesh, and calcined at 1100° F. to a volatile content of 1.5%. The calcined granules were divided into portions and each portion was impregnated with a different amount of calcium sulfate, i. e., 3%, 3.8%, 5%, and 10% by weight, respectively. The impregnation was accomplished by soaking the bauxite granules in an appropriate quantity of calcium chloride solution, then treating with dilute sulfuric acid, and water washing. One-half of each of the calcium sulfate impregnated samples was dried and calcined at 750° F., while the remaining half portions were further impregnated with 9.5% molybdenum oxide $MoO_3$. The incorporation of this catalyst was accomplished by adding ammonium molybdate solution to the calcium sulfate-hardened granules, mixing for 30 minutes, then drying and heating at 750° F. for 2 hours, and thereafter reducing in hydrogen at 900° F. One example is given of bauxite granules impregnated with MoO₃ but containing no calcium sulfate.

To determine the hardness or resistance to break-down, the various 2/4 mesh samples with and without calcium sulfate and molybdenum oxide were tumbled in a metal cylinder 10 inches in length and 4 inches in diameter rotated at 19 R. P. M. for 1 hour, and then screened to determine the amount of break-down. The results are presented in the following table, and the notations "per cent T/4, per cent T/8, per cent T/20," etc., denote the percentage of the samples passing through a 4 mesh screen, an 8 mesh screen, and a 20 mesh screen, respectively. The smaller the percentages, the less the break-down.

| CaSO₄ | Percent MoO₃ | Hardness | | |
|---|---|---|---|---|
| | | Percent T/4 | Percent T/8 | Percent T/20 |
| 0.0 | 0.0 | 11.8 | 6.3 | 3.2 |
| 0.0 | 9.5 | 9.2 | 3.3 | 1.9 |
| 3.0 | 0.0 | 3.7 | 3.3 | 2.6 |
| 3.0 | 9.5 | 2.3 | 1.7 | 1.5 |
| 3.8 | 0.0 | 3.1 | 2.8 | 2.3 |
| 3.8 | 9.5 | 2.9 | 2.1 | 1.7 |
| 5.0 | 0.0 | 2.8 | 2.0 | 1.6 |
| 5.0 | 9.5 | 3.8 | 1.0 | 1.0 |
| 10.0 | 0.0 | 3.0 | 2.2 | 1.7 |
| 10.0 | 9.5 | 2.3 | 1.6 | 1.1 |

(2) Another natural bauxite ore was dried, crushed, screened to 2/4 mesh, and calcined at 1100° F. A portion of the 2/4 mesh granules were impregnated with 9.8% MoO₃ as described hereinbefore. Another portion of the 2/4 mesh granules was hardened by incorporating 4.1% calcium sulfate by soaking with calcium chloride solution, treating with dilute sulfuric acid, washing, drying, and calcining. A portion of the calcium sulfate-hardened granules are impregnated with 9.6% MoO₃ as described above. The tests upon the resulting samples are given below.

| Hardness | Unhardened Bauxite | CaSO₄ hardened Bauxite |
|---|---|---|
| Percent T/4 | 10.7 | 0.6 |
| Percent T/6 | 5.9 | 0.6 |
| Percent T/8 | 3.4 | 0.4 |
| Impregnated with MoO₃: | | |
| Percent MoO₃ | 9.8 | 9.6 |
| Surface Area (Sq. meters/gm.) | 72 | 71 |

The calcium sulfate-hardened bauxite of the present invention may be produced in any desired mesh size, for example, 2/4, 4/8, 10/20, 20/40, or 30/60 mesh. Such material may be used as a catalyst or catalyst carrier; as a refining or decolorizing agent for oils, fats, waxes, and sugar solution; and as a dehumidifying agent for gas or vapors; or as a dehydrating agent for a variety of fluids such as hydrocarbons, alcohols, esters, ketones, and the like.

I claim:
1. A method for hardening thermally activated bauxite granules which comprises impregnating the bauxite granules with 2% to 10% by weight of calcium sulfate by precipitation on the bauxite granules of the calcium sulfate from a solution of a soluble salt of calcium, and heating the bauxite granules containing the calcium sulfate at a temperature not exceeding 1200 degrees F.

2. A method for hardening thermally activated bauxite granules, which comprises mixing with the bauxite granules, a solution of a soluble salt of calcium in an amount sufficient to give 2% to 10% calcium sulfate in the granules, treating the mixture with dilute sulfuric acid, washing the granules containing calcium sulfate, and heating same at a temperature not exceeding 1200° F.

3. A method for hardening thermally activated bauxite granules, which comprises mixing with the bauxite granules, a solution of calcium chloride in an amount sufficient to give 2% to 10% calcium sulfate in the granules, treating the mixture with dilute sulfuric acid, washing the granules containing calcium sulfate, and heating same at a temperature not exceeding 1200° F.

4. A method for hardening thermally activated bauxite granules, which comprises mixing with the bauxite granules, a solution of calcium chloride in an amount sufficient to give about 5% calcium sulfate in the granules, treating the mixture with dilute sulfuric acid, washing the granules containing calcium sulfate, and heating same at a temperature not exceeding 1200° F.

5. A catalyst formed by mixing thermally activated bauxite granules and a solution of a soluble salt of calcium in an amount sufficient to give 2% to 10% calcium sulfate in the granules, treating the mixture with dilute sulfuric acid, washing the granules containing calcium sulfate, and heating same at a temperature not exceeding 1200 degrees F.

6. A catalyst formed by impregnating thermally activated bauxite granules with 2% to 10% by weight of calcium sulfate, and heating the bauxite granules containing the calcium sulfate at a temperature not exceeding 1200 degrees F.

HEINZ HEINEMANN.

REFERENCES CITED

The following references are of record in the file of this patent:

UNITED STATES PATENTS

| Number | Name | Date |
|---|---|---|
| 2,067,920 | Heuser | Jan. 19, 1937 |